United States Patent
Yamamoto et al.

(10) Patent No.: US 7,360,373 B2
(45) Date of Patent: Apr. 22, 2008

(54) VEHICLE AIR-CONDITIONING SYSTEM

(75) Inventors: Kiyokazu Yamamoto, Isesaki (JP);
Toshiyuki Kawai, Isesaki (JP)

(73) Assignee: Sanden Corporation, Gunma (JP)

( * ) Notice: Subject to any disclaimer, the term of this patent is extended or adjusted under 35 U.S.C. 154(b) by 304 days.

(21) Appl. No.: 11/194,472

(22) Filed: Aug. 2, 2005

(65) Prior Publication Data
US 2006/0026982 A1    Feb. 9, 2006

(30) Foreign Application Priority Data
Aug. 3, 2004 (JP) ............................. 2004-227045

(51) Int. Cl.
*B60H 1/32* (2006.01)
(52) U.S. Cl. .............................. 62/244; 62/515; 62/470
(58) Field of Classification Search .......... 62/239–244, 62/470, 515–524
See application file for complete search history.

(56) References Cited

U.S. PATENT DOCUMENTS

| | | | |
|---|---|---|---|
| 2,361,855 A * | 10/1944 | McCormack | 62/470 |
| 5,918,475 A * | 7/1999 | Sakakibara et al. | 62/186 |
| 6,772,602 B2 * | 8/2004 | Vetter et al. | 62/239 |
| 6,854,286 B2 * | 2/2005 | Bureau et al. | 62/244 |
| 7,028,496 B2 * | 4/2006 | Komatsu | 62/239 |

FOREIGN PATENT DOCUMENTS

JP    08178481    7/1996

* cited by examiner

*Primary Examiner*—William E. Tapolcai
(74) *Attorney, Agent, or Firm*—Baker Botts, L.L.P.

(57) ABSTRACT

An evaporator placed in a vehicle compartment includes a meandering flattened pipe, a header joined with one end of the flattened pipe for introducing a compressed refrigerant from a compressor placed in an engine room, and a header joined with the other end of the flattened pipe for discharging the refrigerant toward the compressor, wherein both headers are located in the engine room.

17 Claims, 3 Drawing Sheets

VEHICLE AIR-CONDITIONING SYSTEM

BACKGROUND OF THE INVENTION

1. Field of the Invention

This invention relates to a vehicle air-conditioning system, specifically a vehicle air-conditioning system using a flammable refrigerant in a refrigerating circuit.

2. Description of the Related Art

The vehicle air-conditioning system of this type has a refrigerating circuit including a refrigerant circulating path, a compressor, a condenser and an evaporator. It is known that use of a flammable refrigerant in place of a chlorofluorocarbon refrigerant contributes much to decrease of burdens on the environment.

However, when the flammable refrigerant is used, a measure against the leak thereof is required. This is because if the flammable refrigerant leaks from a system or a circulating path included in the refrigerating circuit, the risk of the flammable refrigerant catching fire is high. Hence, a technique in which when the leak of the refrigerant from the refrigerating circuit is detected by a sensor, the operation of the compressor is stopped or the circulating path is blocked is disclosed in Japanese Unexamined Patent Publication No. hei 8-178481.

In this type of vehicle air-conditioning system, the evaporator is placed in a vehicle compartment. Specifically, while the compressor and the condenser are placed in an engine room, the evaporator is placed in the vehicle compartment adjacent to the engine room, inside an instrument panel. Since passengers get in and out of the vehicle compartment, not the engine room, as a measure against the leak of the flammable refrigerant, prevention of leak of the refrigerant from the evaporator to the vehicle compartment is particularly essential.

However, if the refrigerant leaks near the evaporator, even if the operation of the compressor is stopped or the circulating path is blocked in the conventional way, the refrigerant near the evaporator can still flow into the vehicle compartment. In other words, the conventional technique still has a problem about ensuring passenger safety.

Further, when the flammable refrigerant is used, attention needs to be paid to problems such as decrease in cooling performance and compressor durability, in addition to ensuring the passenger safety.

This is because, even when prevention of global warming is intended by using the flammable refrigerant, if the energy efficiency of the air-conditioning system is low, it cannot be said that real decrease of burdens on the environment is achieved.

SUMMARY OF THE INVENTION

An object of this invention is to provide a vehicle air-conditioning system which can ensure the passenger safety and decrease burdens on the environment.

This object is achieved by a vehicle air-conditioning system according to this invention, which is a vehicle air-conditioning system with a flammable refrigerant circulating through a circulating path, and comprises: a compressor placed in an engine room of a vehicle and inserted in the circulating path, and an evaporator placed in a vehicle compartment adjacent to the engine room and inserted in the circulating path, the evaporator including a meandering flattened pipe; a header joined with one end of the flattened pipe for introducing the compressed refrigerant from the compressor; and a header joined with the other end of the flattened pipe for discharging the refrigerant toward the compressor, both headers being located in the engine room.

In this vehicle air-conditioning system, the serpentine evaporator is connected to the refrigerant circulating path through the headers, and the headers are both located in the engine room, not in the vehicle compartment. Hence, even if the flammable refrigerant leaks from the circulating path, the amount of the flammable refrigerant leaking toward the vehicle compartment is minimized. Thus, the flammable refrigerant can hardly reach a region where it can catch fire, so that the passenger safety in the vehicle compartment improves.

It is desirable that the headers which connect the circulating path and the evaporator be located outside the vehicle compartment, and that the flattened pipe be a continuous pipe without joints. This is clearly different from the arrangement in which the position at which the flattened pipe and the header are brazed is located in the vehicle compartment and the header and the circulating path are connected by a pipe with an O-ring, as seen in a conventional serpentine evaporator; and the arrangement which needs brazing at many places, as seen in a stacked evaporator, etc. Thus, by the present invention, the leak of the flammable refrigerant from joints caused by defective brazing or deterioration of the O-ring is prevented. Since the leak of the flammable refrigerant from the evaporator toward the vehicle compartment is prevented, concern about the use of the flammable refrigerant is obviated. This encourages the active use of this type of refrigerant and promotes the switch to alternative refrigerants. Further, the need to provide a special sensor for detecting the leak of the refrigerant in the vehicle compartment is obviated.

In the circulating path, a compressor, a condenser, a throttling device and an evaporator can be inserted in this order, viewed along the direction of the flow of the refrigerant, and near a discharge opening of the compressor, an oil separating and recovering device for separating the refrigerant and lubricating oil and recovering and returning the lubricating oil to the compressor can be provided. In this case, the lubricating oil hardly flows into the circulating path, apart from a region near the compressor. Consequently, the lubricating oil hardly adheres to the flattened pipe of the evaporator, so that decrease in cooling performance of the air-conditioning system is prevented with certainty. In addition, since the lubricating oil is held in the compressor, the durability of the compressor improves. Further, the respective amounts of the refrigerant and lubricating oil put into the circulating path are decreased.

It is desirable that the refrigerant be HFC-152a. HFC-152a is especially lower in global warming potential (GWP) than HFC-134a, so that it contributes more to decrease of burdens on the environment.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

Embodiments of the present invention will be hereinafter described with reference to the drawings.

Figure 1:
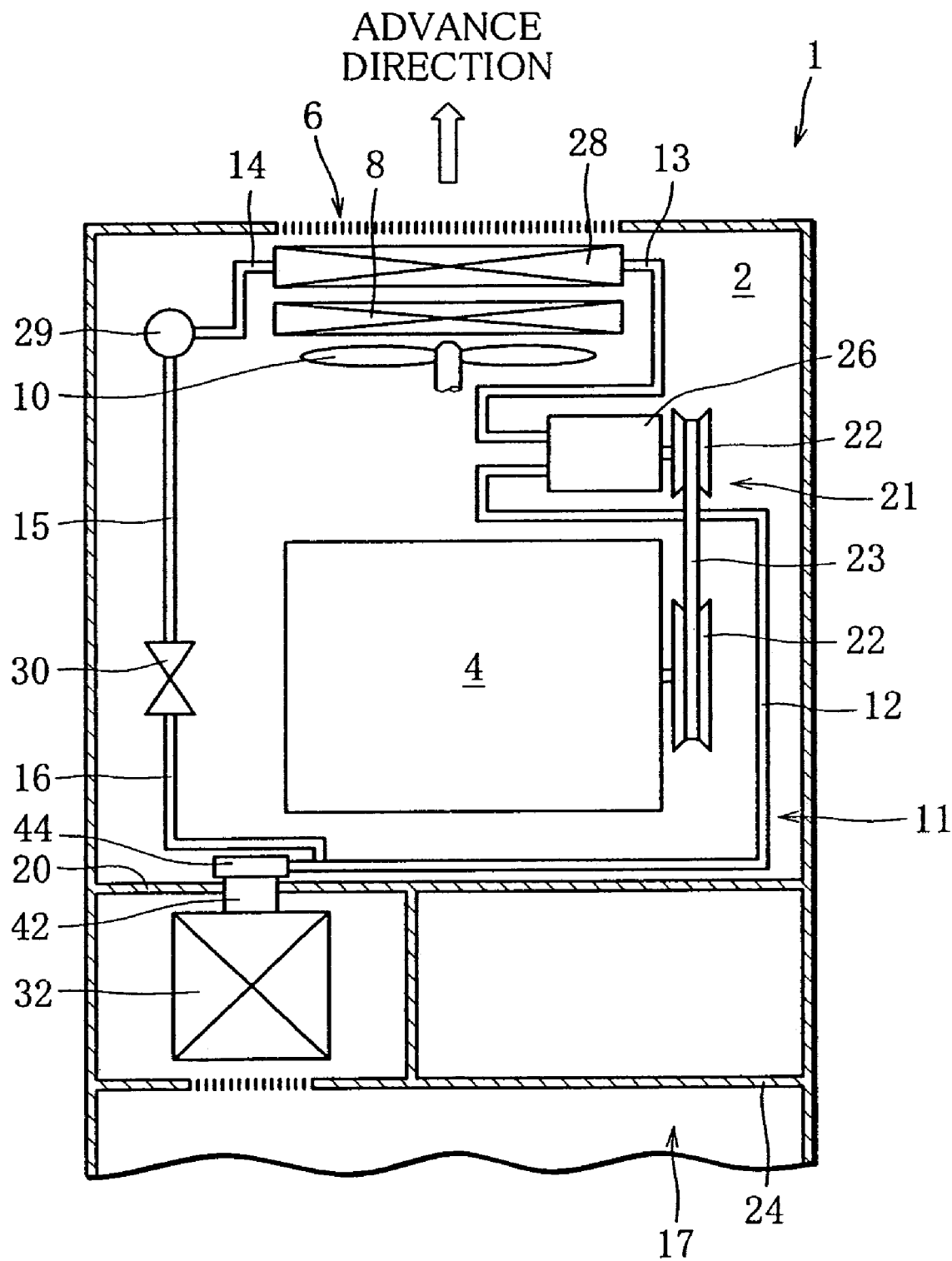
FIG. 1 is a schematic diagram showing a vehicle air-conditioning system in an embodiment of this invention.

FIG. 1 schematically shows a front part of a vehicle 1. An engine room 2 is provided in this front part.

In the engine room 2, an engine 4 is mounted transversely. Between the engine 4 and a front grille 6, a radiator 8 and an electric fan 10 are arranged. When the electric fan 10 is driven, outside air is introduced through the front grille 6 to the radiator 8, and by heat exchange in the radiator 8, engine 4 cooling water is cooled.

The vehicle 1 has an air-conditioning system, and the air-conditioning system includes a refrigerating circuit 11. The refrigerating circuit 11 includes a circulating path comprising path components 12, 13, 14, 15 and 16 for a flammable refrigerant such as propane gas or HFC-152a (hereinafter referred to simply as "refrigerant"), so that the refrigerant can circulate through these path components. By this, the air-conditioning system adjusts the temperature in a vehicle compartment 17 to a desired set temperature.

Specifically, the path components 12, 13, 14, 15 and 16 mostly extends in the engine room 2 of the vehicle 1, but partly extends in the vehicle compartment 17, specifically inside an instrument panel 24 located in front of seats. The engine room 2 is separated from the instrument panel 24 by a dividing wall (dash panel) 20.

Between the path components 12, 13, 14, 15 and 16, a compressor 26, a condenser 28, a receiver 29, an expansion valve (throttling device) 30 and an evaporator 32 are inserted in this order, from upstream. The path components 13, 14, 15 and 16 in FIG. 1 form an outward section of the circulating path, while the path component 12 forms a homeward section of the circulating path.

The compressor 26 is connected with the engine 4 by a power transmission path 21, and receives power from the engine 4 to operate. The path 21 comprises pulleys 22, 22 fixed on a drive shaft of the compressor 26 and an output shaft of the engine 4, respectively, and a drive belt 23 fitted around the pulleys 22, 22.

The compressor 26, the condenser 28, the receiver 29 and the expansion valve 30 are arranged in the engine room 2, while the evaporator 32 is arranged inside the instrument panel 24.

Specifically, viewed along the vehicle's advance direction, the compressor 26 is arranged in front of the engine 4, and the condenser 28 is right in front of the radiator 8. The receiver 29 is arranged near the condenser 28, and the expansion valve 30 is arranged to a side of the HVAC unit, or in other words, near the inlet and outlet of the evaporator 32.

Figure 2:
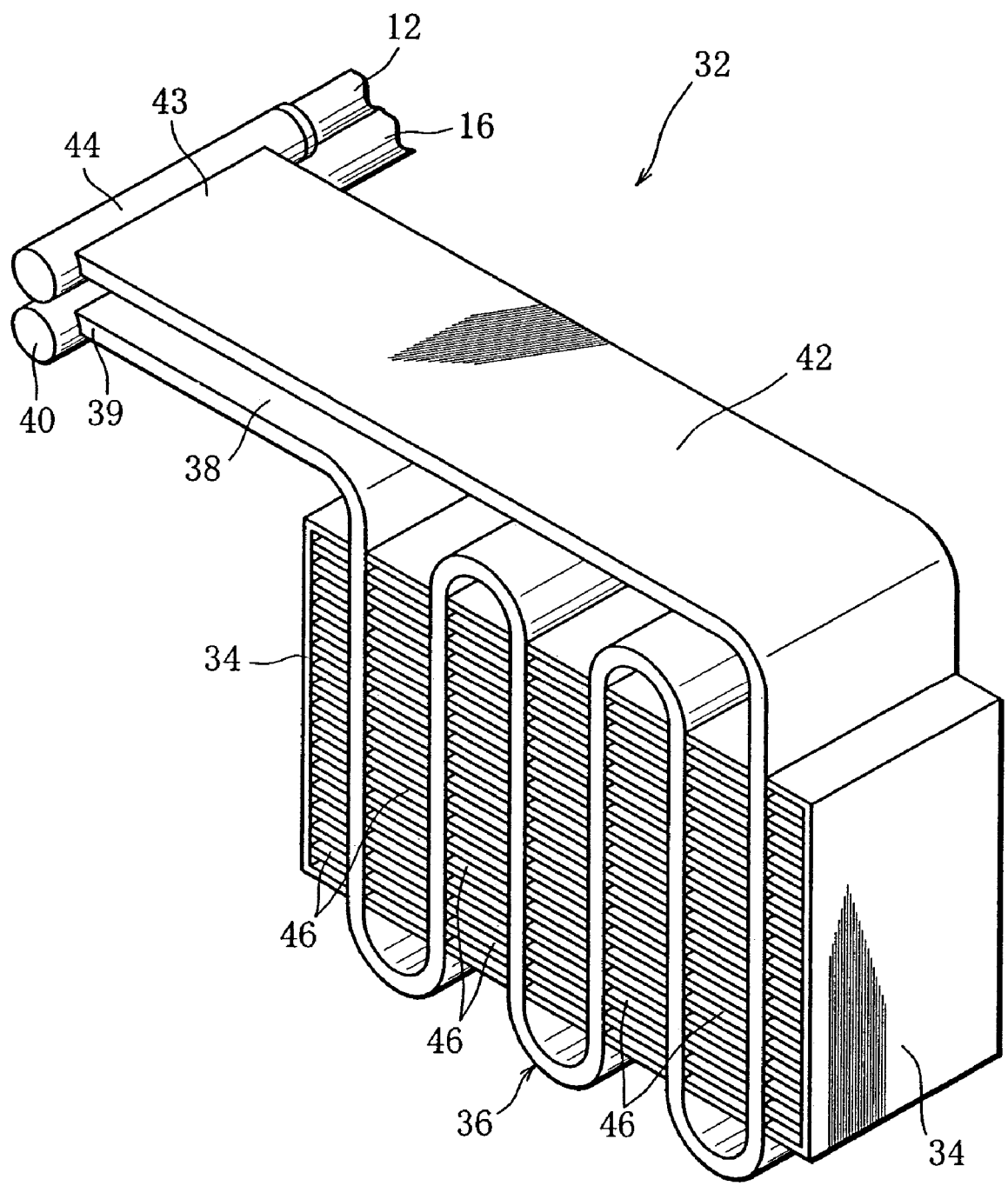
FIG. 2 is a perspective view of an evaporator shown in FIG. 1.

The evaporator 32 is a serpentine evaporator, and shown in detail in FIG. 2.

As shown in the figure, the evaporator 32 has side plates 34, 34, and between the side plates 34, 34, a meandering flattened pipe 36 is arranged along the longitudinal direction of the vehicle 1. The meandering part undulates up and down, and between the upward parts and downward parts of the meandering part, radiator fins 46 are arranged one over another along the height of the vehicle 1.

Each end part of the flattened pipe 36 extends toward the engine room 2. Specifically, from each end of the meandering part of the flattened pipe 36, a first end part 38 and a second end part 42 extend along the longitudinal direction of the vehicle 1. Although the flattened pipe 36 comprises the first end part 38, the second end part 42, and the meandering part between them, as described above, it is formed as a continuous pipe extending from the first end part 38 to the second end part 42 without joints. Inside the flattened pipe, a plurality of refrigerant flow passages (not shown) are formed in parallel, through the first end part 38, the meandering part and the second end part 42.

The end 39 of the first end part 38 is brazed with a refrigerant introducing header (referred to simply as "header") 40 so that the refrigerant flow passages are connected with the interior of the header 40 hermetically. The header 40 is joined with the path component 16, so that the refrigerant from the compressor 26 is introduced to the flattened pipe 36 through the header 40.

Meanwhile, the end 43 of the second end part 42 is brazed with a refrigerant discharging header (referred to simply as "header") 44 so that the refrigerant flow passages are connected with the interior of the header 44 hermetically. The header 44 is joined with the path component 12, so that the refrigerant flowing through the flattened pipe 36 is discharged toward the compressor 26 through the header 44. These headers 40 and 44 are both arranged outside the vehicle compartment 17, namely in the engine room 2 (FIG. 1).

In the above-described air-conditioning system, when the compressor 26 comes into operation, the compressor 26 compresses a refrigerant in a dry gas state flowing from the evaporator 32, and supplies the refrigerant in a high-temperature high-pressure gas state to the condenser 28 through the path component 13. In the condenser 28, the refrigerant in the high-temperature high-pressure gas state is cooled while it is maintained at the equal pressure, and the refrigerant in a liquid state is made to flow through the path component 14 to the receiver 29.

The refrigerant in the liquid state is temporarily retained in the receiver 29, and the refrigerant in the high-pressure liquid state is supplied to the expansion valve 30 through the path component 15. In the expansion valve 30, the refrigerant in the high-pressure liquid state is constricted and expanded, so that the refrigerant in a wet gas state, namely in a low-temperature low-pressure gas-liquid mixing state is spurted out into the evaporator 32 through the path component 16.

The two-phase refrigerant in the gas-liquid mixing state is introduced to the flattened pipe 36 through the header 40. While the refrigerant passes through the flattened pipe 36, heat exchange is performed. Specifically, in the evaporator 32, the refrigerant is evaporated, and since the evaporation takes heat, air around the evaporator 32 is cooled. The cooled air is sent to the vehicle compartment 17 side, so that the cooling of the vehicle compartment 17 is performed.

The refrigerant that has passed through the flattened pipe 36 returns to the compressor 26 through the header 44 and the path component 12. Then, it is compressed again by the compressor 26 and circulates through the path components 13, 14, 15 and 16 as described above.

As is understood from the above, the present embodiment is arranged to eliminate, from the serpentine evaporator 32 placed in the vehicle compartment 17, all the possible places which are located in the vehicle compartment 17 and from which the flammable refrigerant can leak.

Specifically, the refrigerant introducing header 40 and the refrigerant discharging header 44 are both located in the engine room 2, not in the vehicle compartment 17. Even if the flammable refrigerant leaks from any of the path components 12, 13, 14, 15 and 16, the amount of the flammable refrigerant leaking to the vehicle compartment 17 is minimized. In other words, the flammable refrigerant can hardly reach a region of the vehicle compartment 17 where the flammable refrigerant can catch fire, so that the passenger safety is improved.

Further, the flattened pipe 36 joined with the header 40 and the header 44 is formed as a continuous pipe without joints. Hence, the leak of the flammable refrigerant caused by defective brazing or deterioration of an O-ring, which is seen in a conventional serpentine evaporator, a stacked evaporator, etc., is prevented. When the leak of the flammable refrigerant from the evaporator 32 to the vehicle compartment 17 is prevented, concern about the use of the flammable refrigerant is obviated, which encourages the active use thereof and promotes the switch to alternative refrigerants.

Further, there is no need to provide a special sensor for detecting the leak of the refrigerant in the vehicle compartment 17, which contributes to reduction of costs.

One embodiment of the present invention has been described so far. It is to be noted that the present invention is not limited to this embodiment.

Figure 3:
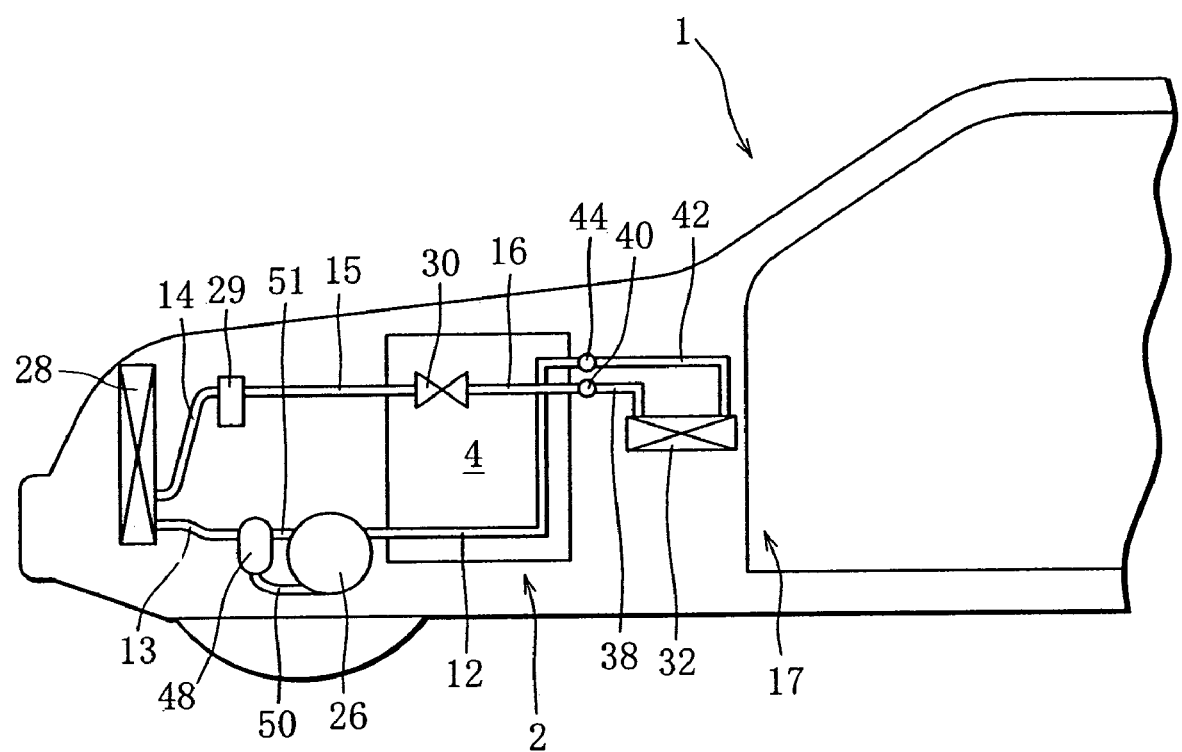
FIG. 3 is a schematic diagram showing a vehicle air-conditioning system in another embodiment.

For example, an oil separating and recovering device for separating the refrigerant and lubricating oil and recovering and returning the lubricating oil to the compressor 26 can be provided near a discharge opening of the compressor 26. The specific arrangement is shown in FIG. 3, where the functionally identical parts to those in the described embodiment are indicated by the identical reference signs.

As shown in the figure, an oil separator (oil separating and recovering device) 48 is arranged between the compressor 26 and the condenser 28. The oil separator 48 has an oil return pipe (oil separating and recovering device) 50 joined with a suction opening (not shown) of the compressor 26, and separates the refrigerant and the lubricating oil flowing from a pipe 51 joined with a discharge opening (not shown) of the compressor 26. The refrigerant is made to circulate through the path component 13, while the lubricating oil is made to flow through the pipe 50 and thereby returned to the compressor 26.

This arrangement is intended to obviate a drawback of the serpentine evaporator 32: While the serpentine evaporator 32 has an advantage that it is composed of a small number of components and made easily, it does not easily satisfy a demand for high performance, compared with a stacked evaporator, etc.

When the evaporator 32 and the oil separator 48 for the compressor 26 arranged as described above are used, the lubricating oil hardly flows into the circulating path comprising the path components 12, 13, 14, 15 and 16, apart from a region near the compressor 26. Specifically, even when, for example, HFC-152a having high mutual solubility to the lubricating oil is used, the lubricating oil hardly adheres to the flattened pipe 36. Thus, decrease in cooling performance of the air-conditioning system caused by increase in pressure loss in the evaporator 32 is prevented with certainty, so that the demand for high performance is satisfied. Further, since the lubricating oil is held in the compressor 26, the durability of the compressor 26 improves. Consequently, the energy efficiency of the air-conditioning system improves, so that real decrease of burdens on the environment is achieved.

Further, by providing the oil separator 48, the respective amounts of the refrigerant and lubricating oil put into the circulating path comprising the path components 12, 13, 14, 15 and 16 are both decreased, which leads to decrease in operating costs.

It is concerned that the flammable refrigerant with the lubricating oil dissolved in can burn more fiercely, compared with the flammable refrigerant alone. However, when the oil separator 48 is provided as described above, the amount of the flammable refrigerant with the lubricating oil dissolved in, circulating in the circulating path comprising the path components 12, 13, 14, 15 and 16 decreases, so that the safety in the case of leak further improves.

As long as the places which are located in the vehicle compartment 17 and from which the flammable refrigerant can leak are eliminated from the evaporator 32, the shapes of the first end part 38 and the second end part 42 of the flattened pipe 36, the shapes of the headers 40 and 44, the positions at which the headers 40 and 44 are joined with the path components 12, 16, respectively, etc. are not necessarily limited to those in the described embodiment.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle air-conditioning system comprising:
a first vehicle chamber and a second vehicle chamber, wherein the first vehicle chamber is adjacent to the second vehicle chamber;
a circulating path disposed in the first and second vehicle chambers and circulating flammable refrigerant therethrough;
a compressor disposed in the first vehicle chamber and disposed in the circulating path, and an evaporator disposed in the second vehicle chamber and disposed in the circulating path, the evaporator comprising a meandering flattened pipe; a first header joined with one end of the flattened pipe for introducing the compressed refrigerant from the compressor to the flattened pipe; and a second header joined with the other end of the flattened pipe for receiving the refrigerant from the flattened pipe and for discharging the refrigerant toward the compressor, wherein both headers are disposed in the first vehicle chamber, and the meandering flattened pipe has opposite ends located in the first vehicle chamber.

2. The vehicle air-conditioning system according to claim 1, wherein the flattened pipe is a continuous pipe without joints and the flattened pipe is joined to the first and second header in the first vehicle chamber.

3. The vehicle air-conditioning system according to claim 1, further comprising a condenser and a throttling device, each of which is disposed in the first vehicle chamber, wherein the condenser and the throttling device are disposed in the circulating path between the compressor and the evaporator.

4. The vehicle air-conditioning system according to claim 1, wherein the refrigerant is HFC-152a.

5. The vehicle air-conditioning system according to claim 3, further comprising an oil separating and recovering device for separating the refrigerant and lubricating oil and recovering and returning the lubricating oil to the compressor, disposed in the first vehicle chamber, wherein the oil separating and recovering device is disposed proximate to the discharge opening of the compressor.

6. The vehicle air-conditioning system according to claim 5, wherein the oil separating and recovering device is disposed between the compressor and the condenser.

7. The vehicle air-conditioning system according to claim 1, further comprising an oil separating and recovering device for separating the refrigerant and lubricating oil and recovering and returning the lubricating oil to the compressor, disposed in the first vehicle chamber, wherein the oil separating and recovering device is disposed proximate to the discharge opening of the compressor.

8. The vehicle air-conditioning system according to claim 7, wherein the oil separating and recovering device is disposed between the compressor and the condenser.

9. A vehicle comprising:
a first vehicle chamber and a second vehicle chamber, wherein the first vehicle chamber is adjacent to the second vehicle chamber;
an air-conditioning system comprising:
  a circulating path disposed in the first and second vehicle chambers and circulating flammable refrigerant therethrough;
  a compressor disposed in the first vehicle chamber and disposed in the circulating path, and
  an evaporator disposed in the second vehicle chamber and disposed in the circulating path, the evaporator comprising a meandering flattened pipe; a first header joined with one end of the flattened pipe for introducing the compressed refrigerant from the compressor to the flattened pipe; and a second header joined with the other end of the flattened pipe for receiving the refrigerant from the flattened pipe and for discharging the refrigerant toward the compressor, wherein both headers are disposed in the first vehicle chamber, and the meandering flattened pipe has opposite ends located in the first vehicle chamber.

10. The vehicle according to claim 9, wherein the flattened pipe is a continuous pipe without joints and the flattened pipe is joined to the first and second header in the first vehicle chamber.

11. The vehicle according to claim 9, further comprising a condenser and a throttling device, each of which is disposed in the first vehicle chamber, wherein the condenser and the throttling device are disposed in the circulating path between the compressor and the evaporator.

12. The vehicle according to claim 9, wherein the refrigerant is HFC-152a.

13. The vehicle according to claim 11, further comprising an oil separating and recovering device for separating the refrigerant and lubricating oil and recovering and returning the lubricating oil to the compressor, disposed in the first vehicle chamber, wherein the oil separating and recovering device is disposed proximate to the discharge opening of the compressor.

14. The vehicle according to claim 13, wherein the oil separating and recovering device is disposed between the compressor and the condenser.

15. The vehicle according to claim 9, further comprising an oil separating and recovering device for separating the refrigerant and lubricating oil and recovering and returning the lubricating oil to the compressor, disposed in the first vehicle chamber, wherein the oil separating and recovering device is disposed proximate to the discharge opening of the compressor.

16. The vehicle according to claim 15, wherein the oil separating and recovering device is disposed between the compressor and the condenser.

17. The vehicle according to claim 9, wherein the first vehicle chamber is an engine room an the second vehicle chamber is a vehicle compartment.

* * * * *